Patented July 15, 1952

2,603,661

UNITED STATES PATENT OFFICE 2,603,661

LEUCKART SYNTHESIS

William F. Bruce, Havertown, Pa., and Vincent J. Webers, Racine, Wis., assignors to Wyeth Incorporated, Philadelphia, Pa., a corporation of Delaware Application August 19, 1948, Serial No. 45,207

7 Claims. (Cl. 260—562)

The invention relates to the preparation of formylamino and amino derivatives and more particularly involves a catalytic process for obtaining formylamino compounds by the reaction of a ketone and a formamide.

The preparation of certain commercially important amines has heretofore depended to a great extent on the utilization of the well-known Leuckart reaction. This reaction, as first reported in the literature, involved the use of ammonium formate, which with benzophenone formed N-benzhydryl formamide. The latter compound when hydrolyzed formed the corresponding amine. Subsequent to the disclosure of this reaction a great many ketones have been tried and found to proceed as with benzophenone. The Leuckart reaction has therefore been adapted to the preparation of important physiologically active amines, such as the sympathomimetic amines, by selecting the proper ketone for the reaction. As an example, if one starts with phenylacetone, the final hydrolysis of the formamide product will yield the central nervous stimulating compound, amphetamine. An important advantage of the Leuckart reaction is essentially in the relative simplicity of the reaction. However, certain inherent difficulties in carrying out this reaction have been a spur to seeking other methods for preparing important amines.

The primary disadvantage of the Leuckart process and the chief reason for seeking other methods of amine preparation is the requirement for ammonium formate. Because of its instability, this reagent is not known to be commercially available and therefore is prepared only for immediate use. Moreover, the preparation of ammonium formate is involved and difficult to carry out on a relatively large scale.

This invention involves the discovery of a method for reacting ketones with commercially available and easily obtainable formamide or simple formamide derivatives and completely avoiding the necessity for using ammonium formate, by carrying out the reaction catalytically. The yields obtained by following this newly discovered process are in many cases as high or higher than that achieved by the standard Leuckart reaction. In some cases where the yields are somewhat lower, the benefits derived by avoiding the use of ammonium formate more than adequately compensate for the lower yields.

The reaction may be postulated by the following equations:

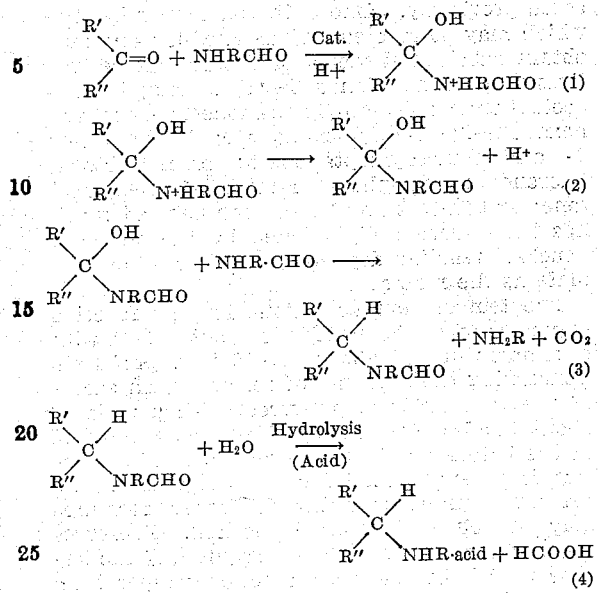

In the above formulae, R is intended to represent either hydrogen or lower alkyl radicals, preferably a methyl or ethyl group, while R' and R" may represent either alkyl, aryl, aralkyl or substituted aryl or aralkyl radicals. Substituents for hydrogen atoms in the latter case may be alkyl, alkoxy, nitro or halogen radicals as desired, or in fact any substituent which does not interfere in the reaction.

The reaction for the formation of formylamino products, as indicated above, is catalyzed in the presence of a selected salt of a relatively strong acid and moderately strong to a relatively weak base. Thus, bases of the group I metals are excluded because they are strong bases in contradistinction to the bases of the group II metals which form moderately strong bases. The cation component of the catalyst may be either metallic or non-metallic but preferably it is a di- and tri-valent metal and more preferably, a di- and tri-valent metal selected from the second or third groups of the periodic table. The effectiveness of the catalyst is believed to be based on its ability to furnish either a proton or the equivalent of it, such as single or multiple positively charged metallic or non-metallic ions. However it should be clearly understood that the invention is not to be limited to this theorical reason for the mode of action advanced as a possible explanation.

It has been found that best results are obtained if the catalyst selected is appreciably soluble in the reactants and does not completely precipitate out of solution during the reaction. The preferred catalytic salts may be obtained by reacting a di- or tri-valent metal or metal salt or hydroxide with strong mineral or organic acids such as the halogen acids, as for example hydrochloric, hydrobromic, hydroiodic acids; the strong sulfur acids such as sulfuric, chlorosulfonic and sulfamic acids; and such strong organic acids as formic, the mono-, di- and tri-halogenated acetic acids, citric, etc.

The ketonic reactant selected for the reaction depends in large measure on the particular amino compound desired as the final product, the ketone being represented by the general formula

where R' and R'' represent the radicals as indicated previously. Among the particular ketones which may be reacted and from which one may obtain substantial yields of the formyl derivatives may be mentioned benzophenone; benzylacetophenone; 4-methylpentanone-2; 4-methylhexanone-2; 4-ethylhexanone-2; heptanone-2; 4- and 6-methylheptanone-2; phenylacetone; fluorenone; camphor; 1-methyl-1-phenylacetone; and in fact any ketone can be used which has been successfully reacted by the standard Leuckart reaction depending on ammonium formate as the reactant.

The temperature conditions for the reaction may range from about 120° to about 200° C. with a temperature of about 170–190° C. preferred. Concerning the amounts of reactants, an excess of the formamide is preferred, with a ratio of about 6 moles of the formamide to about one mol of the ketone particularly preferred. The reaction is generally carried out under atmospheric pressure conditions although higher pressures may of course be used if desired. Pressures higher than atmospheric are required if the ketone used boils below the reaction temperature.

In order to avoid degradation of the reactants and the product, oxygen must be substantially completely excluded from the reaction. This is best done by passing an inert gas such as nitrogen, hydrogen, carbon monoxide or carbon dioxide continuously through the reaction zone during the heating operation. It has been found that substantial yields may be obtained with a reaction time of about 2 to about 4 hours. The amount of catalyst necessary for the reaction is not critical. Thus, as little as 0.05 mol of catalyst has been used per mol of ketone reactant but larger amounts have also been used effectively.

The following specific examples will illustrate the invention in detail but it is to be understood that these examples are not to be considered as limitative of the conditions or of the particular reactants used.

EXAMPLE I 85 grams of benzophenone (0.467 mole), 110 cc. of 99% formamide (6×0.467 mole), 3 grams of $MgCl_2$ and a chip of porous plate were placed in a 200 cc. balloon flask equipped with an air-reflux condenser. The air was displaced with nitrogen, and the flask immersed in an oil bath maintained at about 190–200° C. After boiling had started, the temperature in the flask is at 180–190° C., and a small amount of ammonium carbonate sublimed into the reflux condenser, and ammonia and carbon dioxide were evolved. At exactly four hours after boiling started, the flask was removed from the oil bath, allowed to cool to about 140°, and cautiously poured into about 200 cc. of cold water. (If it was cooled much below 130°, the formyl derivative crystallized, and removal from the flask was difficult.)

The flask was washed out with a little water, and the mixture of benzophenone, N-benzhydryl formamide, and water soluble substances was cooled, seeded with a crystal of benzophenone, and the mixture of solids collected on a Buchner funnel, washed with a little water, and dried. The amount of benzophenone and of N-benzhydryl formamide in the mixture of solids was determined by distillation in vacuo without a column. Benzophenone boils at 114° at 1.2 mm., but was collected at 120–130° in order to speed up the distillation. When the benzophenone was all gone, the boiling point rose rapidly, at 160° the receiver changed, and then the remaining formyl derivative was distilled with strong enough heating to prevent crystallization in the side arm of the flask. The amide boils at 173° at 1.2 mm., but as before, it saved time to collect it at 185–190°. A small amount of tar (about a gram) remained in the Claisen flask. A yield of 95.6% benzhydrylformamide was thus obtained.

EXAMPLE II

A reaction as described in Example I was carried out with pure formamide (99%) but without a catalyst, 45 grams of benzophenone and 55 cc. of formamide being used. The temperature was held at about 200° C. (bath temperature) with an inside temperature of 187° C. The yield of benzhydrylformamide was found to be 21.7%.

EXAMPLE III 110 cc. formamide and 53 g. of methyl isobutyl ketone were placed in a 200 cc. acetylation flask having an air condenser. To the flask was also added 0.4 g. of magnesium carbonate mixed with 0.8 g. of chloroacetic acid (equivalent to 1 gram of magnesium chloroacetate). The flask was heated in a wax bath and air was displaced with inert gas. Refluxing became vigorous at 160° C. and the temperature was slowly raised to 190° C. over about 4 hours. The reaction mixture was washed with ether, and the ether was evaporated on a steam bath. The ether extract was now vacuum distilled. Some ketone still remaining distilled over at 30–35° C. at 6 mm. The main fraction distilled over at 75–81° C. at 4 mm. This was 2-formamido-4-methyl pentane. Its refractive index at 20° C. was 1.4528. It was then mixed with hydrochloric acid which resulted in the formation of 2-amino-4-methyl pentane hydrochloride, subliming at 150° C.

EXAMPLE IV

The reaction as described in Example I was carried out using $Pb(OCOCH_3)_2$. The inside temperature was maintained at about 186° C. A yield of 57.2% of the formamide was obtained.

EXAMPLE V

The reaction as described in Example I was carried out using $ZnCl_2$. The yield of the formamide was 64%.

EXAMPLE VI

The reaction as described in Example I was carried out using $Fe_3C_6H_5O_7$ (ferric citrate). The yield of the formamide was 83%.

EXAMPLE VII

The reaction as described in Example I was carried out using $AlCl_3$. The yield of the formamide was 89.1%.

EXAMPLE VIII

The reaction as described in Example I was carried out using 3 g. of $(NH_4)_2SO_4$ in place of $MgCl_2$. The yield of the formamide was 80%.

EXAMPLE IX

Hydrolysis of formyl benzhydrylamine 259 g. of formyl benzhydrylamine was added to 200 cc. of concentrated hydrochloric acid and the whole was refluxed for one hour, giving at first a gummy material which soon became a hard crystalline mass. This was removed from the flask, ground in a mortar, washed with water and dried to give 95% of the expected benzhydrylamine hydrochloride. This was converted to free amine by addition of excess sodium hydroxide, extraction with benzene, and distillation, B. P. 120° C.

It should be noted that benzophenone was selected as the ketone in substantially all of the examples described above in view of the fact that side reactions are at a minimum with this compound and the product obtained is readily identified.

We claim as our invention:

1. The process comprising reacting a ketone free of interfering radicals with a formamide selected from the group consisting of unsubstituted formamide and a lower-alkyl formamide in the presence of magnesium chloride as a catalyst for the reaction and separating the formylamido compound thus produced as a product of the process.

2. In the process of reacting a ketone with an amide selected from the group consisting of unsubstituted formamide and a lower alkyl formamide to form an N-formyl compound, the improvement consisting in conducting said reaction catalytically by the addition to said reagents of an inorganic salt characterized by its stability and its appreciable solubility in the reaction mixture, said salt being a salt of a strong acid and a base no stronger than bases of the group II metals.

3. In the process of reacting a ketone with an amide selected from the group consisting of unsubstituted formamide and a lower alkyl formamide to form an N-formyl compound, the improvement consisting in conducting said reaction catalytically by the addition to the reaction zone of a metal salt characterized by its stability and its appreciable solubility in the reaction mixture, said salt being a salt of a strong acid and a base no stronger than bases of the group II metals.

4. In the process of reacting a ketone with an amide selected from the group consisting of unsubstituted formamide and a lower alkyl formamide to form an N-formyl compound, the improvement consisting in conducting said reaction catalytically by the addition to the reagent of a salt characterized by its stability and its appreciable solubility in the reaction mixture, said salt being a salt of a strong acid and a base no stronger than bases of the group II metals.

5. The process comprising catalytically reacting, in the substantial absence of oxygen, a ketone and an amide selected from the group consisting of unsubstituted formamide and a lower alkyl formamide, to form an N-formyl compound, and carrying out said reaction in the presence of a salt of a strong acid and a base no stronger than bases of the group II metals, said salt being further characterized by its stability and its appreciable solubility in the reaction mixture.

6. The process comprising catalytically reacting in the substantial absence of oxygen a ketone boiling within a temperature range of about 120° to about 200° C., and an amide selected from the group consisting of unsubstituted formamide and a lower alkyl formamide, to form an N-formyl compound, and carrying out said reaction in the presence of a salt of a strong acid and a base no stronger than bases of the group II metals, said salt being further characterized by its stability and its appreciable solubility in the reaction mixture, said reaction being carried out at a temperature of about 120°–200° C.

7. The process of preparing N-formyl compounds, comprising reacting a ketone, free of reaction-interfering groups with an amide of the group consisting of formamide and a lower alkyl substituted formamide to form an N-formyl compound, and carrying out said reaction in the presence of a salt catalyst which is stable and appreciably soluble in the reaction mixture, and which constitutes a metal selected from the group consisting of divalent and trivalent metals, combined with an anion of a strong acid.

WILLIAM F. BRUCE.
VINCENT J. WEBERS.

REFERENCES CITED

The following references are of record in the file of this patent:

UNITED STATES PATENTS

| Number | Name | Date |
|---|---|---|
| 2,210,837 | Kastner | Aug. 6, 1940 |
| 2,246,529 | Nabenhauer | June 24, 1941 |
| 2,378,880 | Burwell et al. | June 19, 1945 |
| 2,386,273 | Shonle et al. | Oct. 9, 1945 |
| 2,394,092 | Nabenhauer | Feb. 5, 1946 |

OTHER REFERENCES

Ingersoll et al., "J. Am. Chem. Soc.," vol. 58 (1936), pp. 1808 to 1811.

Novelli, "J. Am. Chem. Soc.," vol. 61 (1939), pp. 520–521.

Schiedt, "J. Prakt. Chem.," vol. 157 (1941), pp. 203 and 204.

Adams et al., "Organic Reactions," vol. V (1949), pp. 305, 306, 310, 311 and 317.

Houben, "Die Methoden der Organischen Chemie," 3rd ed., vol. 3 (1943), p. 576.

Weygand, "Organic Preparations," (1945), pp. 253–255.